United States Patent
Naito et al.

(10) Patent No.: US 7,999,853 B2
(45) Date of Patent: Aug. 16, 2011

(54) MOVING IMAGE REPRODUCING APPARATUS AND PROCESSING METHOD THEREFOR

(75) Inventors: Satoshi Naito, Yokohama (JP); Toshihiko Fukasawa, Machida (JP); Mamoru Sato, Tokyo (JP); Yukio Chiba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 331 days.

(21) Appl. No.: 12/246,316

(22) Filed: Oct. 6, 2008

(65) Prior Publication Data

US 2009/0096893 A1    Apr. 16, 2009

(30) Foreign Application Priority Data

Oct. 15, 2007  (JP) ................................. 2007-267994
Oct. 15, 2007  (JP) ................................. 2007-267995

(51) Int. Cl.
   *H04N 5/225*   (2006.01)
(52) U.S. Cl. .................................................. 348/207.1
(58) Field of Classification Search ............... 348/207.1
   See application file for complete search history.

(56) References Cited

U.S. PATENT DOCUMENTS

| | | | |
|---|---|---|---|
| 2002/0040475 A1* | 4/2002 | Yap et al. | 725/39 |
| 2003/0077063 A1* | 4/2003 | Hasegawa | 386/39 |
| 2005/0025467 A1* | 2/2005 | Nakamichi et al. | 386/125 |
| 2005/0030427 A1* | 2/2005 | Yamada | 348/559 |
| 2006/0171658 A1* | 8/2006 | Jochemsen et al. | 386/46 |
| 2007/0154172 A1* | 7/2007 | Watanabe | 386/83 |
| 2007/0245024 A1* | 10/2007 | Prus et al. | 709/226 |
| 2008/0005497 A1* | 1/2008 | Prus et al. | 711/154 |
| 2008/0022304 A1* | 1/2008 | Prus et al. | 725/39 |
| 2008/0147910 A1* | 6/2008 | Hibbard et al. | 710/29 |
| 2008/0187293 A1* | 8/2008 | Hong | 386/124 |
| 2009/0040091 A1* | 2/2009 | Carlson et al. | 341/176 |
| 2009/0205010 A1* | 8/2009 | Rodriguez et al. | 725/151 |

FOREIGN PATENT DOCUMENTS

JP   11-146224 A   5/1999

* cited by examiner

*Primary Examiner* — James Hannett
(74) *Attorney, Agent, or Firm* — Canon USA, Inc. IP Div

(57) ABSTRACT

Disclosed is a moving image reproducing apparatus including a reproduction control unit. The moving image reproducing apparatus sequentially transfers at least part of moving image data elements stored in an incorporated memory to an external storage device, stating from a moving image data element to be reproduced last by the reproduction control unit.

15 Claims, 13 Drawing Sheets

MOVING IMAGE REPRODUCING APPARATUS AND PROCESSING METHOD THEREFOR

BACKGROUND OF THE INVENTION

1. Field of the Invention

The present invention relates to a method for processing moving image data to be reproduced by a moving image reproducing apparatus.

2. Description of the Related Art

There is an image transmitting apparatus that transfers image data captured by a digital camera having the communication function or a camera phone to an image storing server through a public line (see, for example, Japanese Patent Laid-Open No. 11-146224). Even when the memory of the digital camera or the camera phone is full with image data, such an image transmitting apparatus can generate free space in the memory by transferring the image data to the server.

To transmit moving image data, a transmitting apparatus needs to not only ensure a large amount of free space but also reduce a delay time from reading of the moving image data to starting of reproducing it.

SUMMARY OF THE INVENTION

The present invention provides a moving image reproducing apparatus capable of quickly reproducing moving image data.

According to an embodiment of the present invention, a moving image reproducing apparatus includes a reproduction control unit configured to control reproduction of one or more moving image data elements. The moving image reproducing apparatus further includes a storage control unit configured to store the moving image data elements in a memory and a transfer unit configured to sequentially transfer at least a part of the moving image data elements stored in the memory to an external storage device, starting from a moving image data element to be reproduced last by the reproduction control unit.

Further features and aspects of the present invention will become apparent from the following description of exemplary embodiments with reference to the attached drawings.

DESCRIPTION OF THE EMBODIMENTS

Various embodiments of the present invention will be described below.

First Exemplary Embodiment

Figure 3:
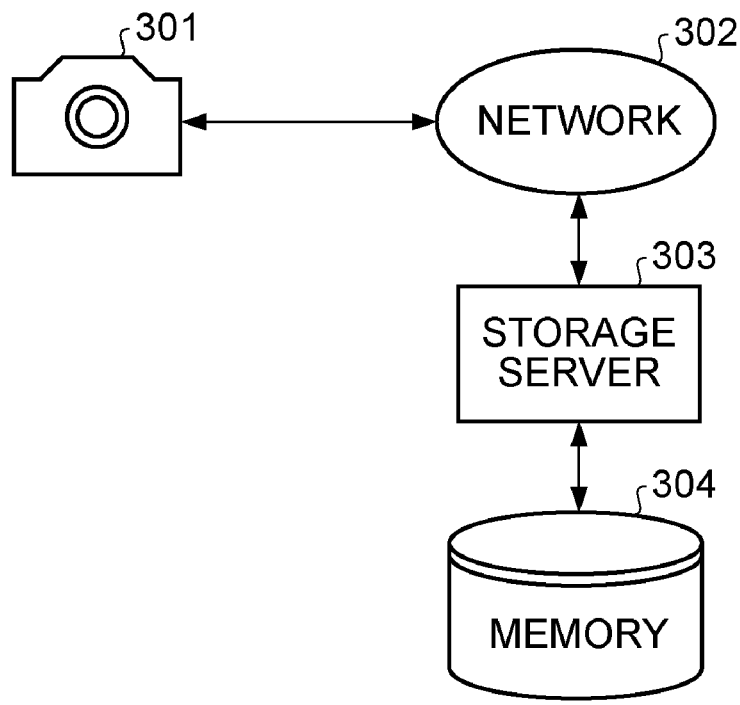
FIG. 3 illustrates an example system configuration according to the first embodiment.

A structure of an image pickup apparatus functioning as a moving image reproducing apparatus according to a first embodiment is described below with reference to FIGS. 1 and 3. Referring to FIG. 3, an image pickup apparatus 301 is a digital camera capable of obtaining moving image data. The image pickup apparatus 301 is connected over a network 302 to a storage server 303. The storage server 303 includes a mass memory 304.

Figure 1:
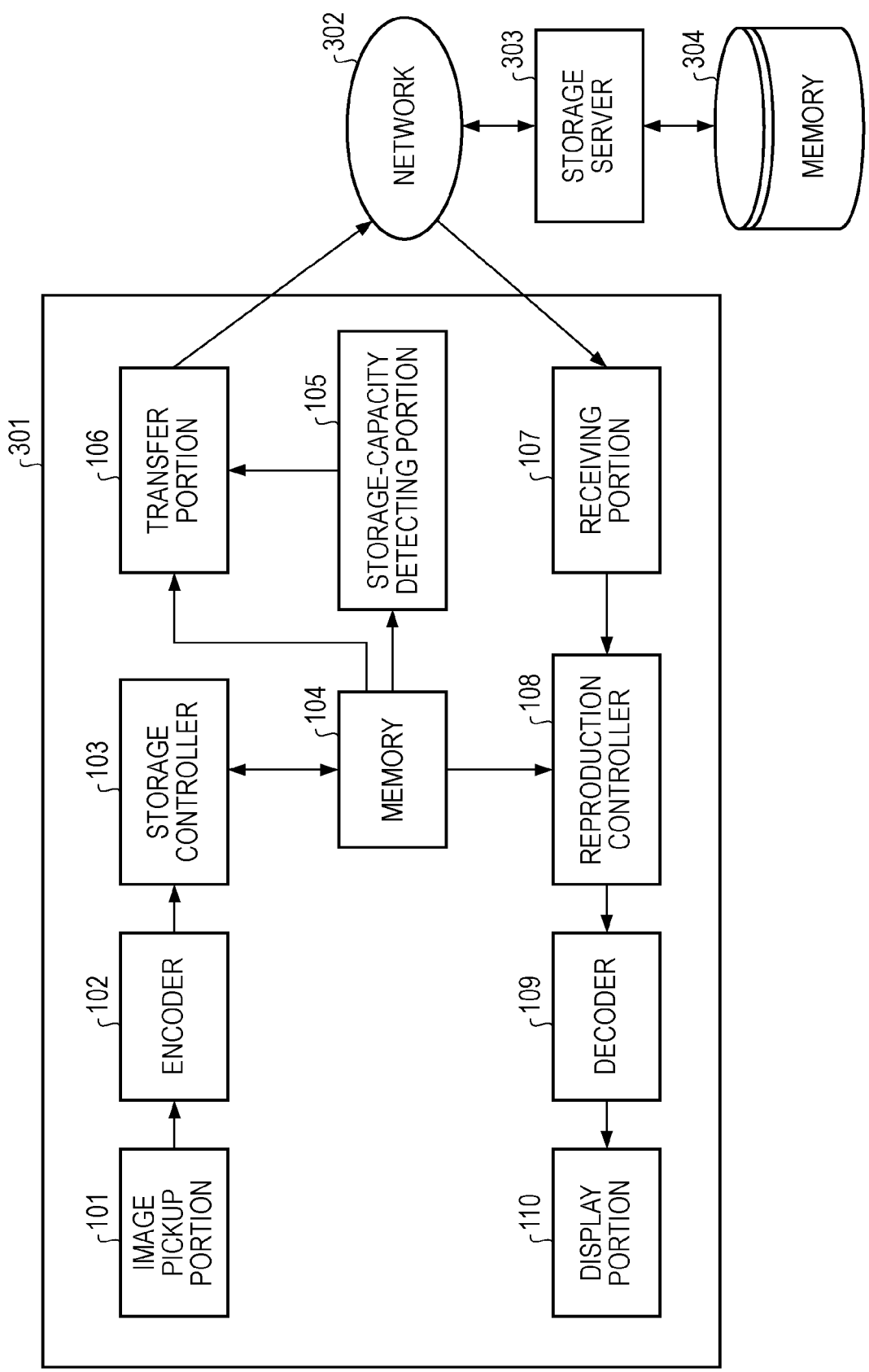
FIG. 1 is a block diagram of an example image pickup apparatus being an image transmitting apparatus according to a first embodiment of the present invention.

FIG. 1 is a block diagram that illustrates an internal structure of the image pickup apparatus 301. Referring to FIG. 1, an image pickup portion 101 includes an image sensor for obtaining moving image data. An encoder 102 encodes obtained moving image data. In the present embodiment, MPEG-2 is assumed to be used as a coding system. However, the present invention is not limited to this coding standard. For example, moving image data can be encoded using other coding systems, such as Motion-JPEG and H.264. Alternatively, moving image data can also be output without being encoded.

A storage controller 103 causes a memory 104 to store part of moving image data. The memory 104 is a memory capable of storing moving image data. The memory 104 can be a removable storage medium. The memory 104 can also be an incorporated memory.

A transfer portion 106 transfers moving image data over the network 302 to the storage server 303, which is an external storage device. The moving image data transferred to the storage server 303 and the moving image data stored in the memory 104 are associated with each other by, for example, having the same identifier. Time stamp information is added to the start of each group of pictures (GOP). A reproduction controller 108 sequentially reproduces moving image data in accordance with the time stamp information.

A receiving portion 107 receives moving image data transmitted from the storage server 303 over the network 302. The receiving portion 107 includes a receiving buffer for temporarily retaining moving image data transmitted from the storage server 303.

When receiving an instruction for reproduction, the reproduction controller 108 reads moving image data from the memory 104. Additionally, the reproduction controller 108 provides the storage server 303 with an instruction to read moving image data having the same identifier as in part of the moving image data and receives the moving image data from the receiving portion 107. The reproduction controller 108 outputs the moving image data obtained through the receiving portion 107 to decode it subsequently to the moving image data stored in the reproduction controller 108.

Each of the storage controller 103, a storage-capacity detecting portion 105, the transfer portion 106, the receiving portion 107, and the reproduction controller 108 can be constructed by a control device (central processing unit (CPU)) as hardware. The control device operates in accordance with a program stored in a computer-readable storage medium, such as random-access memory (RAM).

A decoder 109 decodes moving image data output from the reproduction controller 108. A display portion 110 is a monitor capable of reproducing and displaying the decoded moving image data.

Figure 14:
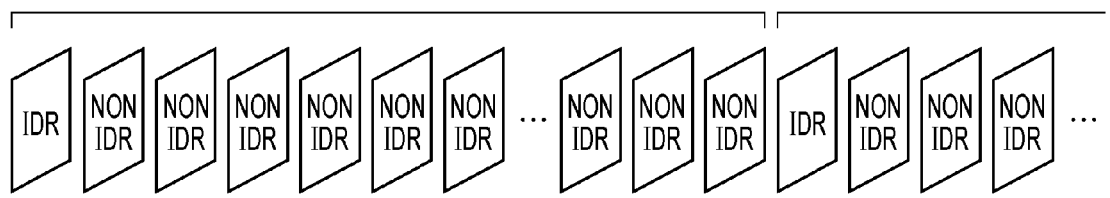
FIG. 14 illustrates an example of pictures corresponding to GOPs in the H.264 coding standard.
Figure 15:
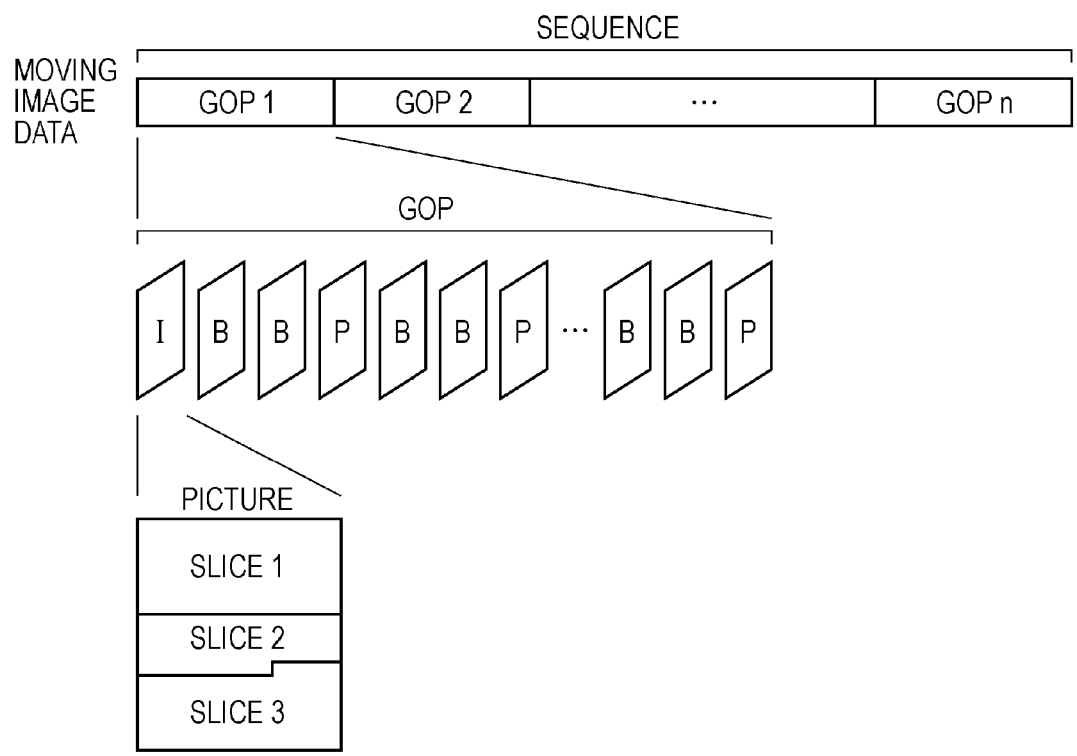
FIG. 15 illustrates example components of coded moving image data.

Example components of moving image data will now be described. As illustrated in FIG. 15, the components of example moving image data are a sequence, groups of pictures (GOPs), pictures, and slices. A sequence is a series of GOPs from the start of image capturing to the end thereof. GOPs are components constituting a sequence, and each of the GOPs is composed of pictures. In FIG. 15, I represents an intra-frame coded picture, P represents a forward predicted coded picture, and B represents a bi-directional predictive coded picture. In general, a GOP is a series of pictures separated by an intra-frame coded picture and is a unit randomly accessible to moving image data. A picture is composed of one or more slices. In H.264, although a component of moving image data called a GOP does not exist, a series of pictures separated by an instantaneous decoding refresh (IDR) picture, as illustrated in FIG. 14, is assumed to be handled as a GOP.

An example process for controlling storage of moving image data performed in the image pickup apparatus according to the present embodiment will now be described.

Figure 13:
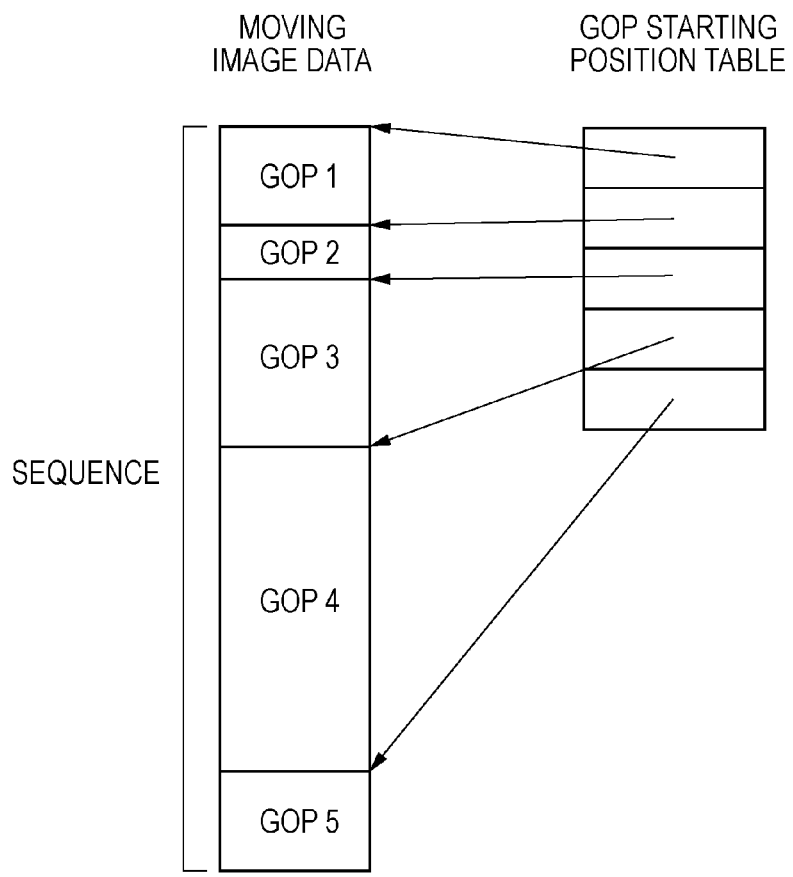
FIG. 13 illustrates an example of a table that stores information on starting positions of GOPs.

When receiving an instruction from a user through an input device (not shown), the storage controller 103 causes the memory 104 to store moving image data output from the encoder 102. As illustrated in FIG. 13, the storage controller 103 also causes the memory 104 to store information on the starting position of each of GOPs constituting each of sequences of the stored moving image data.

After a series of sequences of moving image data is encoded, the storage controller 103 may cause the memory 104 to store information on the starting position of each of the GOPs constituting each of the sequences. The storage controller 103 may also cause the memory 104 to store information on the starting position of each of pictures, instead of GOPs.

Figure 2:
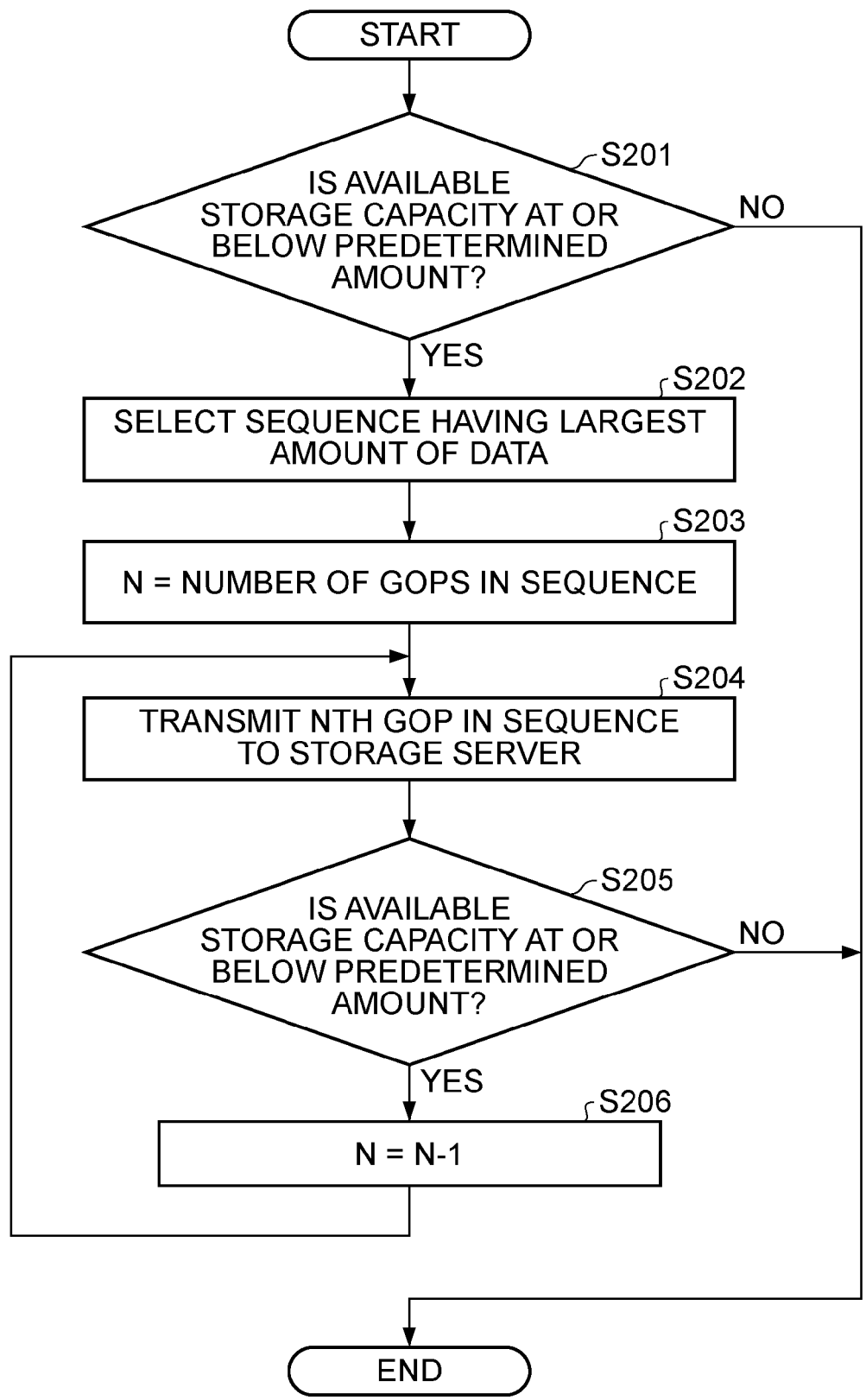
FIG. 2 is a flowchart that shows an example process for transferring moving image data performed by a storage controller according to the first embodiment.

The transfer portion 106 performs processing shown in FIG. 2 based on the amount of data remaining in the memory 104 obtained from the storage-capacity detecting portion 105 and information on the starting position of each GOP stored by the storage controller 103.

First, the transfer portion 106 determines whether the amount of available storage capacity of the memory 104 is at or below a previously set predetermined value (S201). When the amount of available storage capacity of the memory 104 is not at or below the predetermined value (NO in S201), the process ends. When the amount of available storage capacity of the memory 104 is at or below the predetermined value (YES in S201), flow proceeds to step S202.

The transfer portion 106 selects a sequence that has the largest amount of data from sequences of moving image data stored in the memory 104 (S202). Here in the processing of S202, a sequence that has the largest amount of data per unit time may be selected. Alternatively, in response to an instruction from a user, a sequence to be transferred may also be selected.

Then, the transfer portion 106 sets a variable N at the number of GOPs constituting the selected sequence of moving image data (S203). Then, the transfer portion 106 reads Nth GOP coded data within the sequence based on the information on the starting position of GOPs stored by the storage controller 103 (FIG. 13) and transfers it to the storage server 303 (S204). The transferred GOP coded data is deleted from the memory 104. The variable N is the same as the reproduction order of the GOPs constituting the selected sequence of moving image data, so the last GOP within the sequence is transmitted.

Then, the storage controller 103 determines whether the amount of available storage capacity is at or below the predetermined value (S205). When the amount of available storage capacity is not at or below the predetermined value (NO in S205), the process ends. When the amount of available storage capacity is at or below the predetermined value (YES in S205), flow proceeds to step S206. The transfer portion 106 subtracts one from the value of N and performs steps S204 and S205 again.

In the case where the transfer portion 106 receives an instruction to finish transferring from a user through an input device while performing the above processing, if the transfer portion 106 is transmitting a GOP, the transfer portion 106 finishes the process after the completion of transferring all data of the GOP. Otherwise, the transfer portion 106 immediately finishes the process.

The above-described process performed by the transfer portion 106 sequentially transfers moving image data to the storage server 303, stating from a GOP in the rear of the selected sequence, until the amount of available storage capacity of the memory 104 exceeds the predetermined value. The transferred moving image data is stored in the server memory 304 included in the storage server 303. Therefore, even when the transfer portion 106 finishes a transferring process in progress, the rear part of the sequence is stored in the server memory 304 and the forward part of the sequence remains in the memory 104.

In the image pickup apparatus according to the present embodiment, the determination whether transmission of coded data to the storage server is to continue or not is made in accordance with the amount of available storage capacity (S205). However, the present invention is not limited to this embodiment. For example, moving image data may be transmitted to the storage server 303 until the number of GOPs that have not yet been transmitted in a sequence reaches a predetermined value. In this case, because the predetermined number of GOPs from the start of the sequence remains in the memory 104, the time of reproducing the coded data remaining in the memory is ensured. That is, the reproducing time that has no degradation in reproduced image quality incident to a transmission error that can occur on the network 302 is ensured.

In the image pickup apparatus according to the present embodiment, the transfer portion 106 does not transfer moving image data when the amount of available storage capacity is not at or below a previously set predetermined value (NO in S201). However, the present invention is not limited to this embodiment. The transfer portion 106 may always transfer a sequence whose capturing has been completed to the storage server 303, regardless of the amount of available storage capacity.

Additionally, in the image pickup apparatus according to the present embodiment, moving image data is transferred to the storage server 303 on a GOP-by-GOP basis. However, the present invention is not limited to this embodiment. For example, moving image data may be transferred to the storage server 303 in units of a plurality of GOPs. Alternatively, it may also be transferred to the storage server 303 on a picture-by-picture basis or on a slice-by-slice basis.

Figure 12:
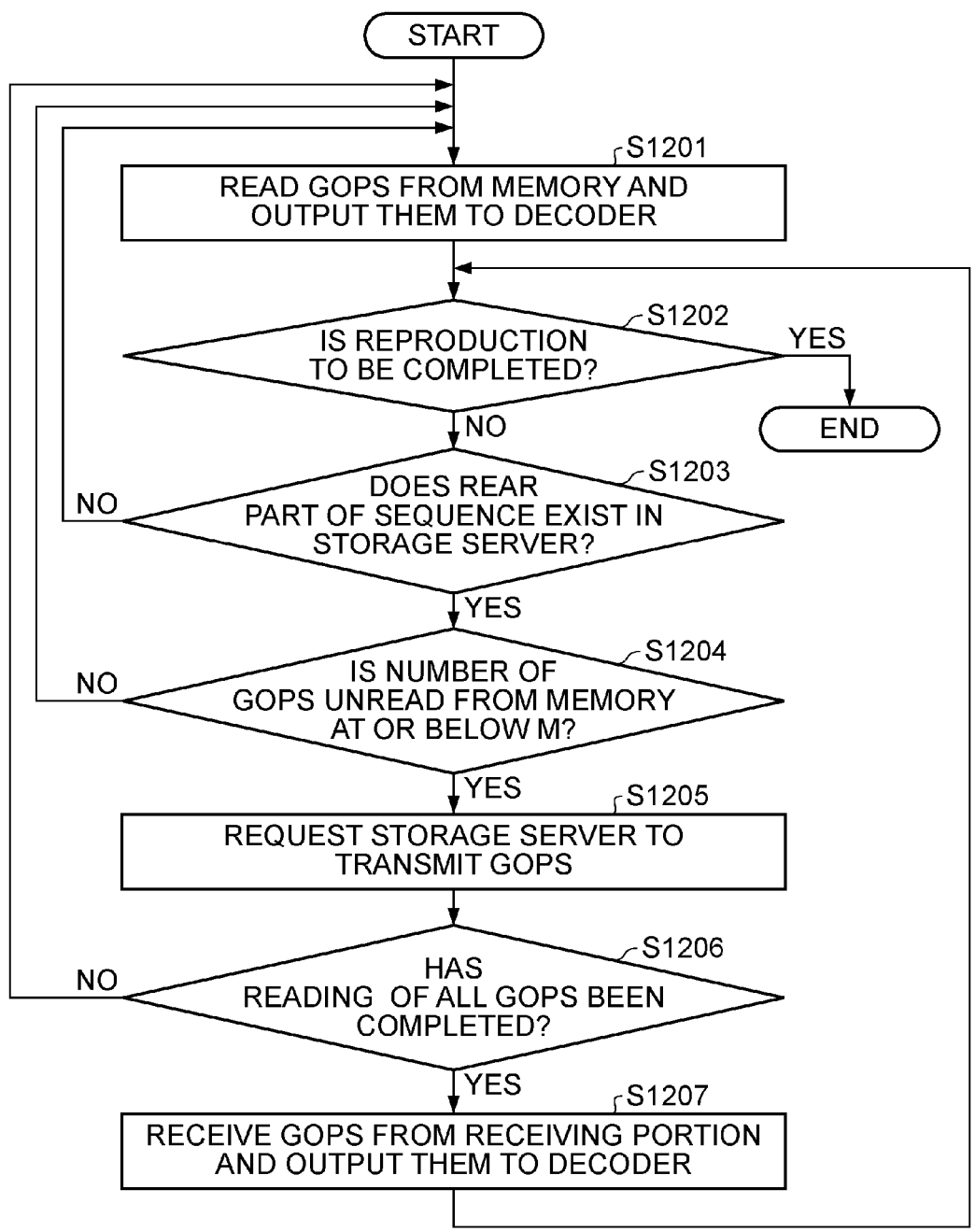
FIG. 12 is a flowchart of an example reproducing process performed by a reproduction controller according to the first embodiment.

An example operation of reproducing moving image data in an image pickup apparatus according to the present embodiment will now be described below with reference to the flowchart illustrated in FIG. 12.

When a user selects a sequence of moving image data through an input device and provides an instruction to reproduce it, the reproduction controller 108 reads GOPs constituting the corresponding sequence from the memory 104 in order of reproduction. Then, the reproduction controller 108 causes the decoder 109 to sequentially decode the read GOPs (S1201).

Then, the reproduction controller 108 determines whether the reproduction is to be completed (S1202). Specifically, when a condition that the decoder 109 completes decoding of all GOPs constituting the sequence or a condition that an instruction to stop the reproduction is provided from a user is satisfied, the reproduction controller 108 finishes the process.

When the reproduction is to be completed (YES in S1202), the reproduction controller 108 finishes the process of the flowchart. Otherwise (NO in S1202), the reproduction controller 108 determines whether one or more GOPs in the rear part of the sequence have been transferred to the storage server 303 (S1203).

When the moving image data (GOPs) in the rear part of the sequence has not been transferred to the storage server 303 (NO in S1203), the reproduction controller 108 performs the processing of S1201 again. Otherwise (YES in S1203), the reproduction controller 108 determines whether the number of GOPs that have not yet been read from the memory 104 is at or below M (S1204).

One example method of calculating the numerical value M can be calculation based on the number of GOPs decoded during the time from when a transmission request is output to the storage server 303 to when the receiving portion 107 receives moving image data (a single GOP data element). Another example may be calculation based on the capacity of the receiving buffer (not shown in FIG. 1). Furthermore, M may be the number of all GOPs constituting the sequence. In this case, the reproduction controller 108 starts reading of the leading GOP in the sequence from the memory 104 and outputs a transmission request to the storage server 303.

When the number of GOPs that have not yet been read from the memory 104 is not at or below M (NO in S1204), the reproduction controller 108 performs the processing of S1201 again. Otherwise (YES in S1204), the reproduction controller 108 requests the storage server 303 to transmit GOPs being moving image data (S1205).

When receiving a transmission request from the image pickup apparatus 301, the storage server 303 sequentially transmits GOPs being moving image data stored in the server memory 304, stating from a GOP to be reproduced first. For example, in the case where, in a sequence composed of GOP 1 to GOP 10, moving image data of GOP 1 to GOP 4 is stored in the memory 104 and that of GOP 5 to GOP 10 is stored in the server memory 304, the moving image data is sequentially transmitted stating from GOP 5. Each of GOPs being moving image data stored in the memory 104 and the storage server 303 is associated with information indicating its reproduction order, and the information is also stored. The reproduction controller 108 can make a request for a GOP based on the associated information.

The reproduction controller 108 determines whether all the GOPs being moving image data stored in the memory 104 have been read (S1206). When not all the GOPs have yet been read (NO in S1206), the reproduction controller 108 performs the processing of S1201 again. When all the GOPs have been read (YES in S1206), the reproduction controller 108 receives the GOPs from the receiving portion 107 and causes the decoder 109 to decode them (S1207). Then, the processing of S1202 and the subsequent steps is performed again.

The reproduction controller 108 in the image pickup apparatus according to the present embodiment may read moving image data or make a transmission request on a picture-by-picture basis or on a slice-by-slice basis.

As described above, the image pickup apparatus according to the present embodiment sequentially transfers at least part of moving image data stored in the incorporated memory 104, starting from moving image data at the rear of a sequence, to the storage server 303. Therefore, the amount of available storage capacity of the memory can be increased, so the time for capturing images can be increased. Because moving image data in the leading end of a sequence is stored in the memory, in which a delay time occurring in reading data is shorter than that in the storage server, the image pickup apparatus according to the present embodiment can quickly reproduce images in response to an instruction to start reproduction. Moreover, in the image pickup apparatus according to the present embodiment, because the forward part of the sequence remains in the memory, when a user finishes reproduction in progress, data transmission over a network does not occur during the reproduction of moving image data. Furthermore, in the image pickup apparatus according to the present embodiment, when transferring data to the storage server 303 is stopped, because the time for reproducing moving image data remaining in the memory is long. Therefore, the time capable of reproducing data without being affected by a transmission error that can occur on a network can be increased.

Second Exemplary Embodiment

A second embodiment will be described below with reference to FIGS. 4 and 5.

Figure 4:
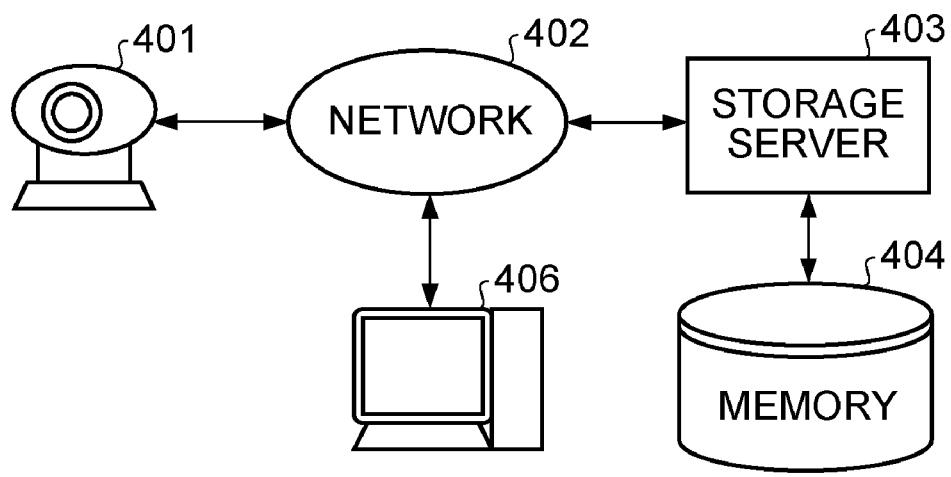
FIG. 4 illustrates an example system configuration according to a second embodiment of the present invention.

Referring to FIG. 4, an image pickup apparatus 401 is a camera capable of obtaining a moving image. A moving image reproducing apparatus 406 can be composed of a general-purpose personal computer (PC) and has the function of reproducing moving image data. The image pickup apparatus 401 is connected to the moving image reproducing apparatus 406 over a network 402. The moving image reproducing apparatus 406 is connected over the network 402 to a storage server 403, which is a storage device. The storage server 403 includes a mass memory 404.

Figure 5:
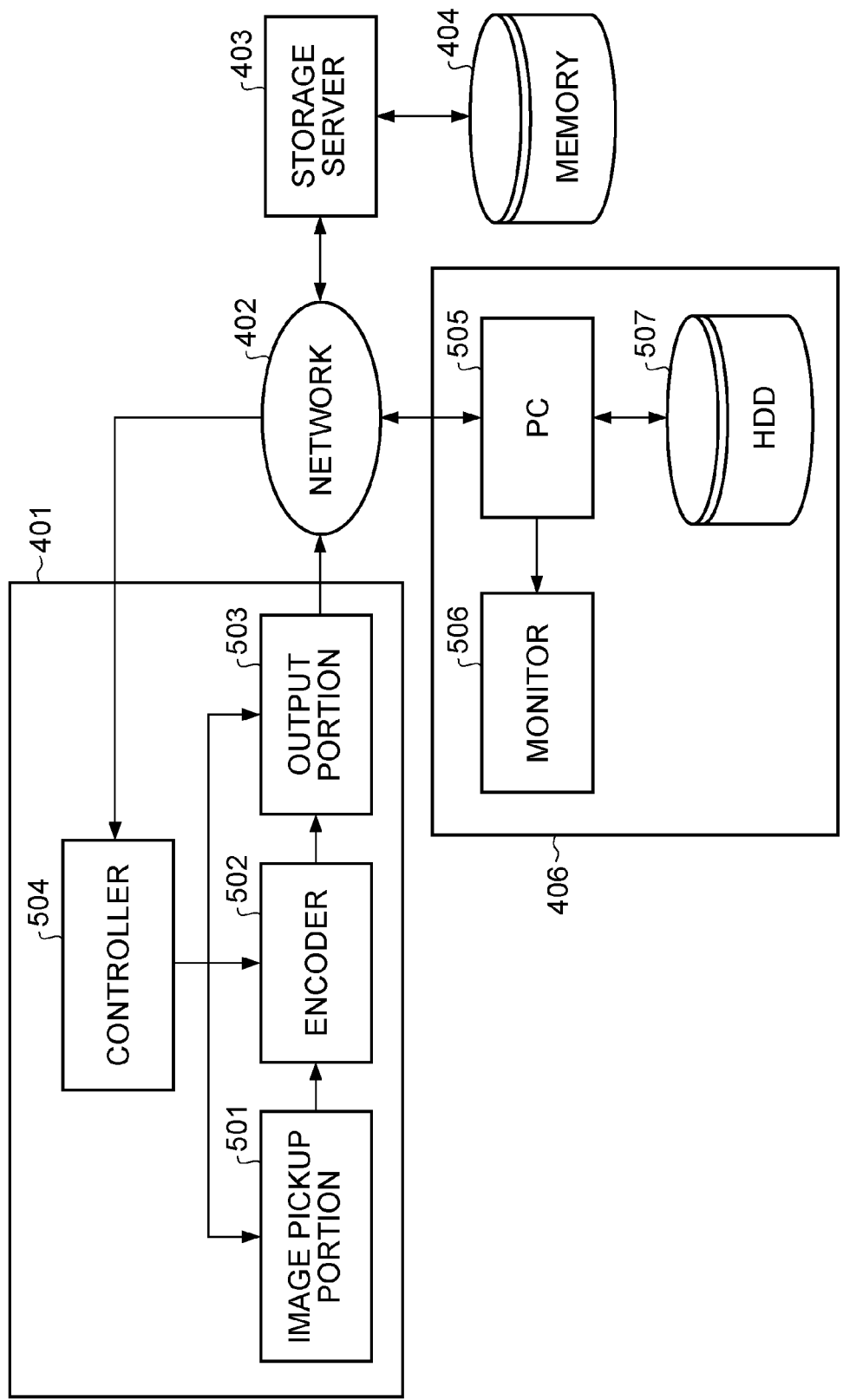
FIG. 5 is a block diagram of an example system according to the second embodiment.

FIG. 5 is a block diagram that illustrates an internal structure of the image pickup apparatus 401 and the moving image reproducing apparatus 406. Referring to FIG. 5, a PC 505 is an information processing apparatus that includes a computer-readable memory storing a program for operating the moving image reproducing apparatus 406 and that also includes a controller executing the program. The PC 505 receives moving image data from the image pickup apparatus 401 over the network 402, causes a hard disk drive (HDD) 507 to store the received moving image data, and causes a monitor 506 to display it. The HDD 507 can be another type of memory, such as a flash memory.

An image pickup portion 501 can be composed of an image sensor. An encoder 502 encodes moving image data obtained by the image pickup portion 501. An output portion 503 outputs the moving image data to the moving image reproducing apparatus 406 over the network 402.

A controller 504 controls the entire system of the image pickup apparatus 401. For example, the controller 504 controls the image pickup apparatus 401 in response to various instructions from the moving image reproducing apparatus 406 over the network 402. Examples of the various instructions include an instruction to start image capturing, that to finish the image capturing, and that to perform panning, tilting, and zooming.

An example operation of the moving image reproducing apparatus 406 will now be described below in detail. When receiving an operation to start image capturing from an input device (not shown), the moving image reproducing apparatus 406 provides the image pickup apparatus 401 with an instruction to start image capturing.

In response to the instruction from the moving image reproducing apparatus 406, the controller 504 instructs the image pickup portion 501, the encoder 502, and the output portion 503 to start an image capturing operation. The obtained moving image data is output from the output portion 503 to the moving image reproducing apparatus 406 and the storage server 403 over the network 402.

In the moving image reproducing apparatus 406, the PC 505 stores moving image data output from the output portion 503 in the HDD 507. When receiving an operation to finish image capturing from a user, the PC 505 provides the image pickup apparatus 401 with an instruction to finish image capturing.

The PC 505 always monitors the amount of available storage capacity of the HDD 507. When the amount of available storage capacity is at or below a predetermined value, the PC 505 performs the processing illustrated in FIG. 2. That processing illustrated in FIG. 2 is the same as the processing performed by the storage controller 103 according to the first embodiment, so the description thereof is not repeated here.

An example operation of reproducing a moving image performed by the moving image reproducing apparatus 406 according to the present embodiment will now be described below.

In response to an instruction to select moving image data to be reproduced from an input device (not shown), the PC 505 sequentially reads moving image data from the HDD 507, starting from the leading GOP of the selected sequence. The PC 505 decodes the moving image data read from the HDD 507 and outputs the decoded moving image data to the monitor 506.

When, of moving image data stored in the HDD 507, the number of GOPs (moving image data) that have not yet been read from the HDD 507 becomes less than M, the PC 505 requests the storage server 403 to transmit moving image data. The storage server 403 sequentially transmits, of moving image data stored in the memory 404, moving image data that are not stored in the HDD 507 to the moving image reproducing apparatus 406, starting from a GOP to be reproduced first.

Subsequent to decoding of all moving image data stored in the HDD 507, the PC 505 decodes moving image data transmitted from the storage server 403 and outputs it to the monitor 506.

Figure 6:
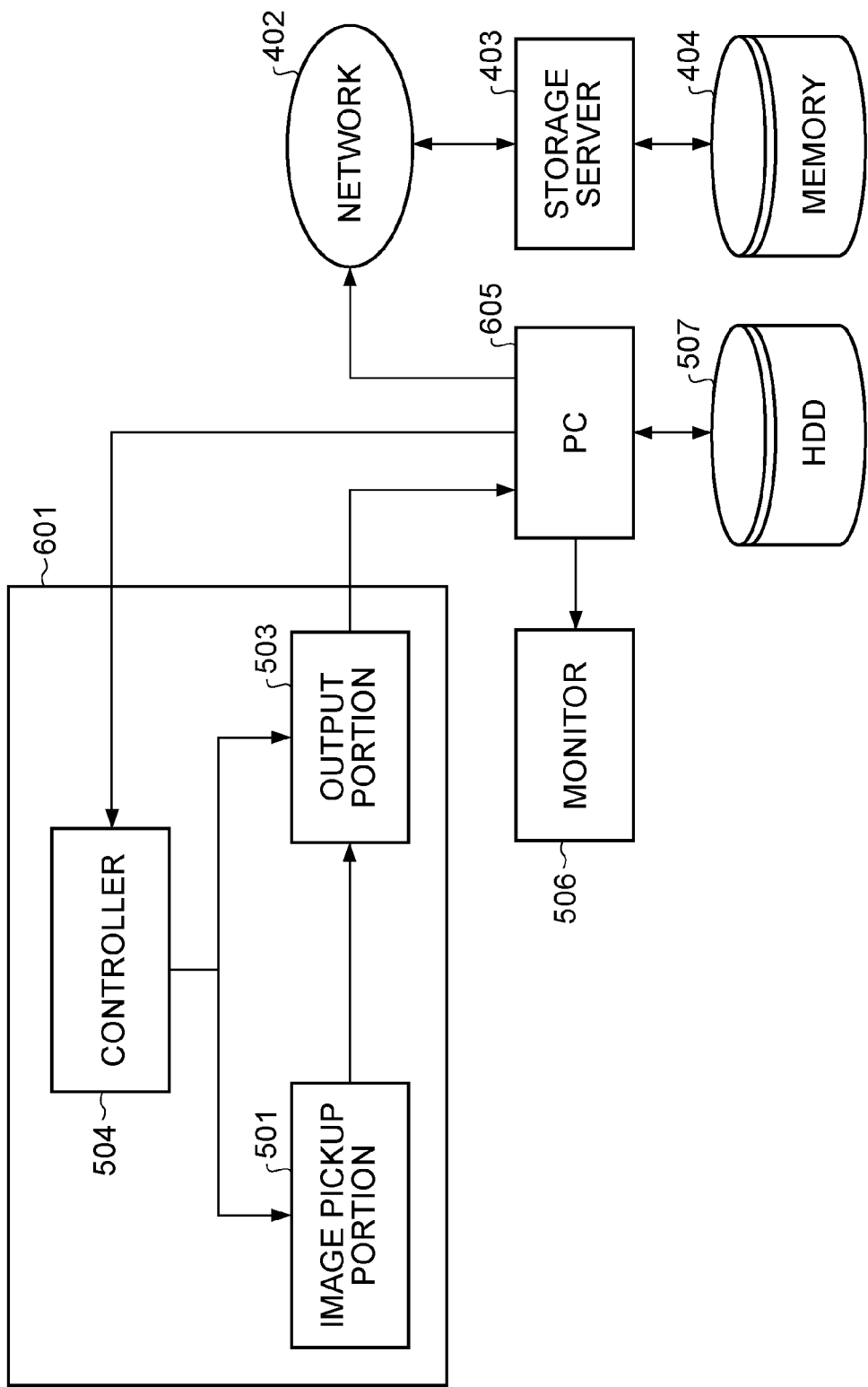
FIG. 6 is a block diagram of an example system according to another embodiment of the present invention.

It is noted that the present invention is not limited to the above description. As illustrated in FIG. 6, an image pickup apparatus 601 and a PC 605 may be directly connected to each other. Moving image data may be encoded by the PC 605, in place of the image pickup apparatus 601. Moving image data may be transferred and reproduced on a picture-by-picture basis or slice-by-slice basis, in place of a GOP-by-GOP basis.

As described above, in the present embodiment, moving image data in the leading end of a sequence is stored in the memory incorporated in the moving image reproducing apparatus 406. Therefore, the moving image reproducing apparatus 406 can quickly reproduce data in response to an instruction to start reproduction from a user. Moreover, when a user finishes reproduction in progress, data transmission over a network may not occur during the reproduction of moving image data.

Third Exemplary Embodiment

A third embodiment will be described below with reference to FIGS. 8 and 9.

Figure 8:
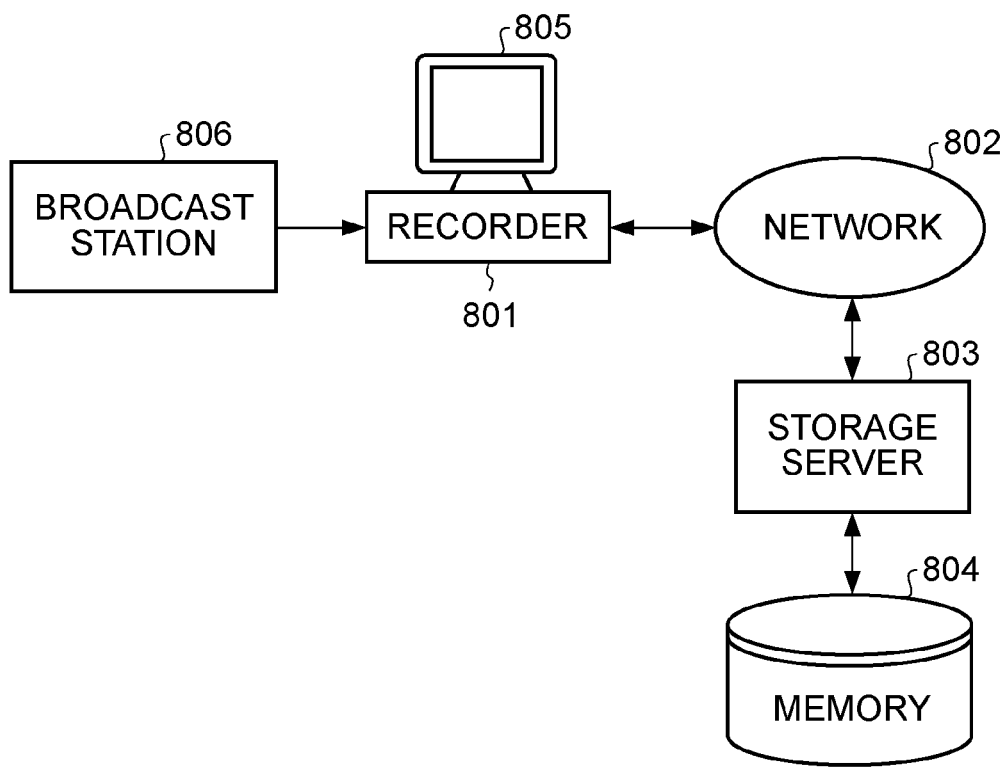
FIG. 8 illustrates an example system configuration according to a third embodiment of the present invention.

Referring to FIG. 8, a recorder 801 functioning as an image reproducing apparatus according to the present embodiment stores moving image data transmitted from a broadcast station 806. A monitor 805 displays the moving image data transmitted from the broadcast station 806 or the moving image data stored in the recorder 801. The recorder 801 is connected over a network 802 to a storage server 803, which is a storage device. The storage server 803 includes a mass memory 804.

Figure 9:
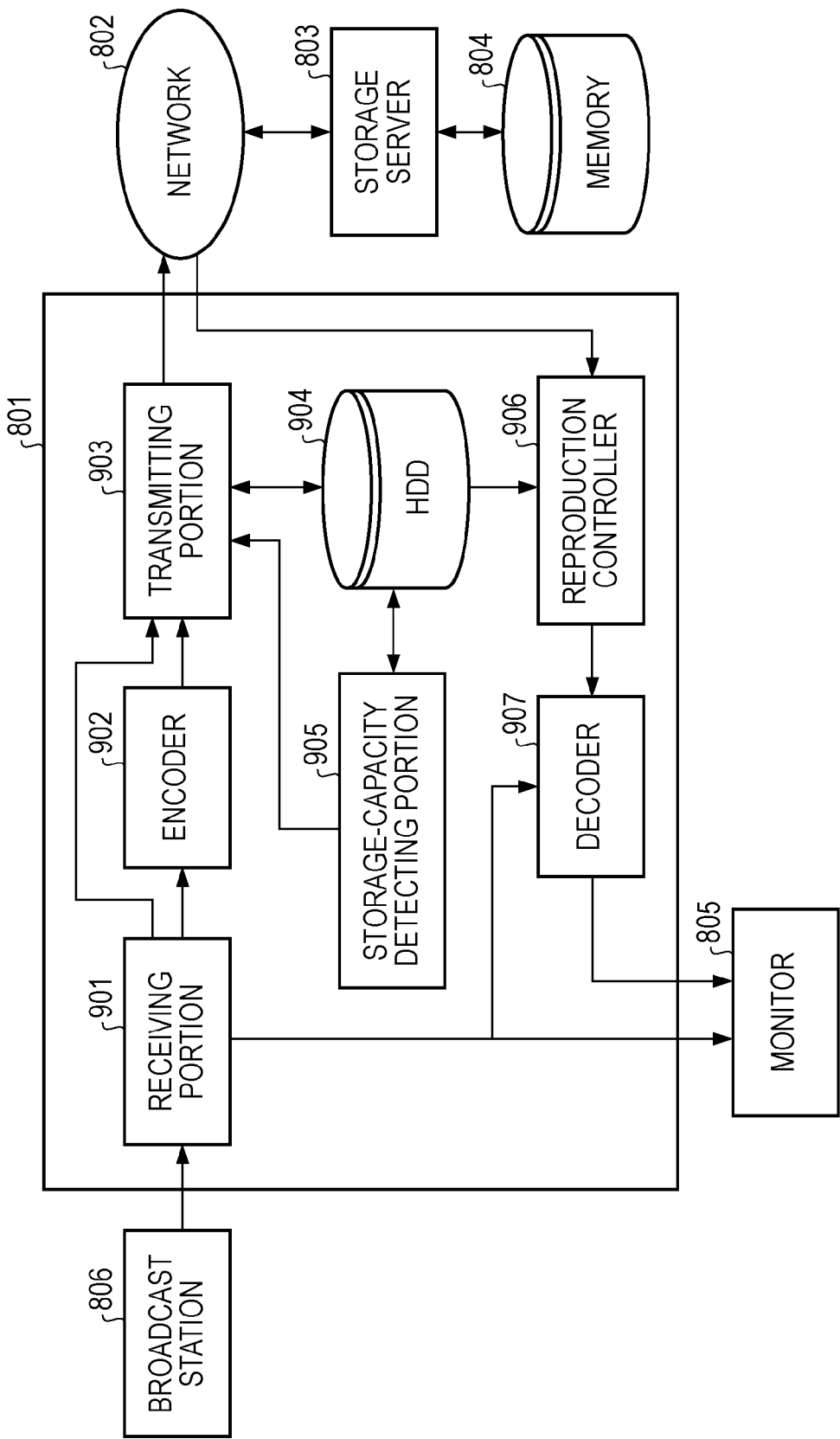
FIG. 9 is a block diagram of an example system according to the third embodiment.
Figure 10:
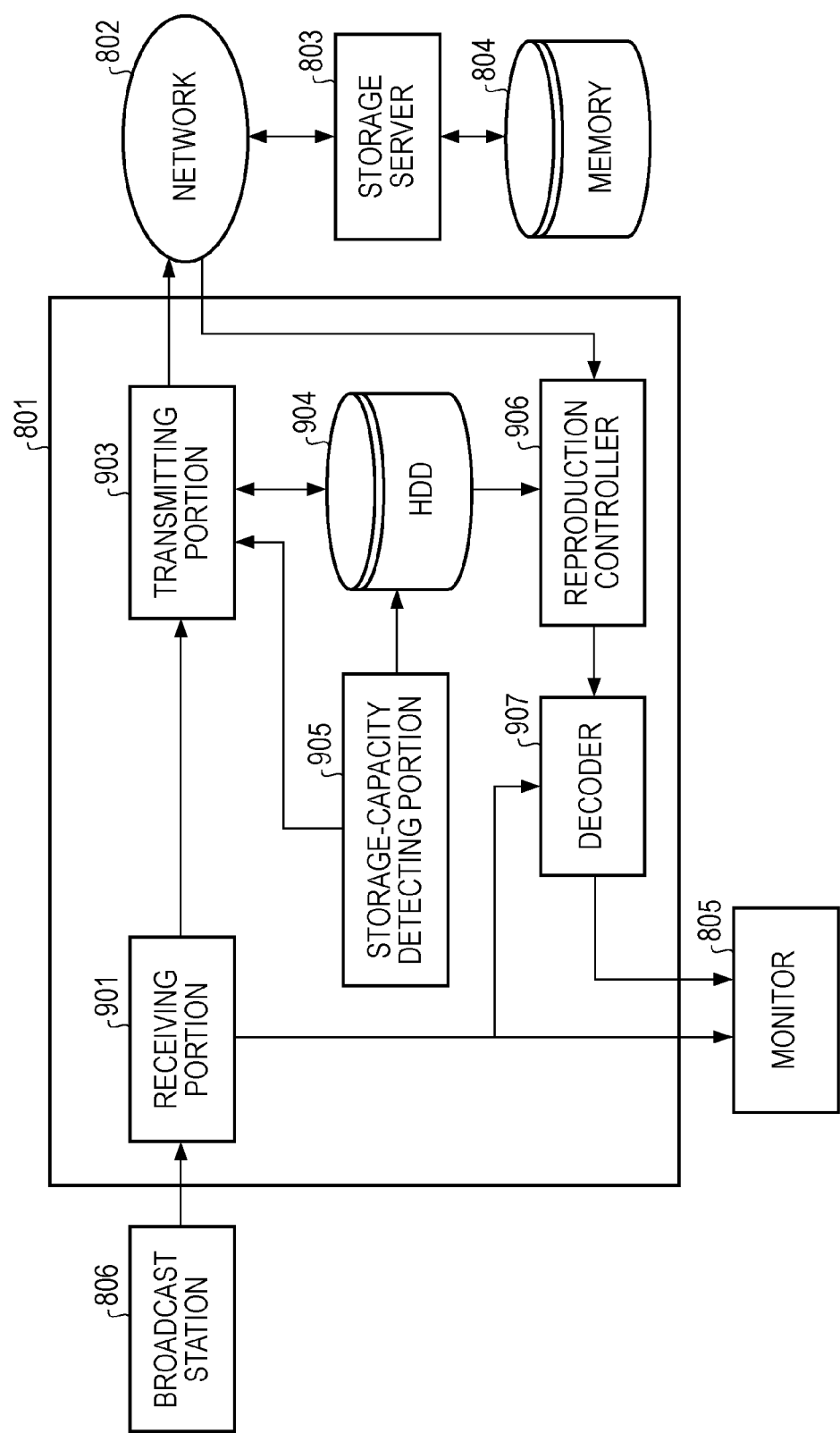
FIG. 10 is a block diagram of an example system according to another embodiment of the present invention.

FIG. 9 is a block diagram that illustrates a structure of the recorder 801.

Referring to FIG. 9, a receiving portion 901 receives moving image data transmitted from the broadcast station 806. An encoder 902 encodes moving image data received by the receiving portion 901. If previously coded moving image data is transmitted from the broadcast station 806, encoding is not performed.

A transmitting portion 903 causes an HDD 904 to store moving image data and also transmits moving image data to the storage server 803 over the network. The HDD 904 is a memory capable of storing moving image data. The HDD 904, which uses an HDD as the memory, may also use a flash memory, for example. A storage-capacity detecting portion 905 detects the amount of available storage capacity of the HDD 904.

A reproduction controller 906 reads moving image data from the HDD 904 or the storage server 803 and causes a decoder 907 to decode the read data in order to display it on the monitor 805. The decoder 907 decodes the moving image data. To display moving image data received by the receiving portion 901 in real time, the decoder 907 decodes moving image data output from the receiving portion 901. To reproduce moving image data stored in the HDD 904, the decoder 907 decodes moving image data output from the reproduction controller 906. The monitor 805 displays a moving image. To display moving image data having not been encoded transmitted from the broadcast station 806, the monitor 805 displays moving image data output from the receiving portion 901. Otherwise, the monitor 805 displays moving image data output from the decoder 907.

An example operation of processing image data performed by the recorder 801 will now be described below in detail.

When receiving an instruction from a user through an input device (not shown), the transmitting portion 903 stores moving image data output from the encoder 902 or the receiving portion 901 in the HDD 904. As illustrated in FIG. 13, the transmitting portion 903 also stores information on the starting position of moving image data of each of the GOPs constituting a sequence in the HDD 904.

The transmitting portion 903 performs the processing illustrated in FIG. 2, depending on the amount of data remaining in the HDD 904 obtained from the storage-capacity detecting portion 905. That processing illustrated in FIG. 2 is the same as the processing performed by the storage controller 103 according to the first embodiment, so the description thereof is not repeated here.

When receiving an instruction to start reproducing moving image data corresponding to a sequence selected by a user, the reproduction controller 906 reads the corresponding moving image data of the sequence from the HDD 904 and outputs it to the decoder 907. Moving image data that is later in the reproduction order in the sequence is stored in the storage server 803, and the number of GOPs (moving image data) that have not yet been read from the HDD 904 becomes less than M. Then, the reproduction controller 906 outputs a request to transmit moving image data that has not been stored in the HDD 904 to the storage server 803.

When receiving a transmission request from the recorder 801, the storage server 803 sequentially transmits GOPs that have not been stored in the HDD 904, starting from a GOP to be reproduced first.

The reproduction controller 906 causes the decoder 907 to decode all moving image data stored in the HDD 904. Subsequent to this, the reproduction controller 906 causes the decoder 907 to decode moving image data transmitted from the storage server 803.

If only moving image data that has been previously encoded is transmitted from the broadcast station 806, for example, the recorder 801 may include no encoder.

Figure 7:
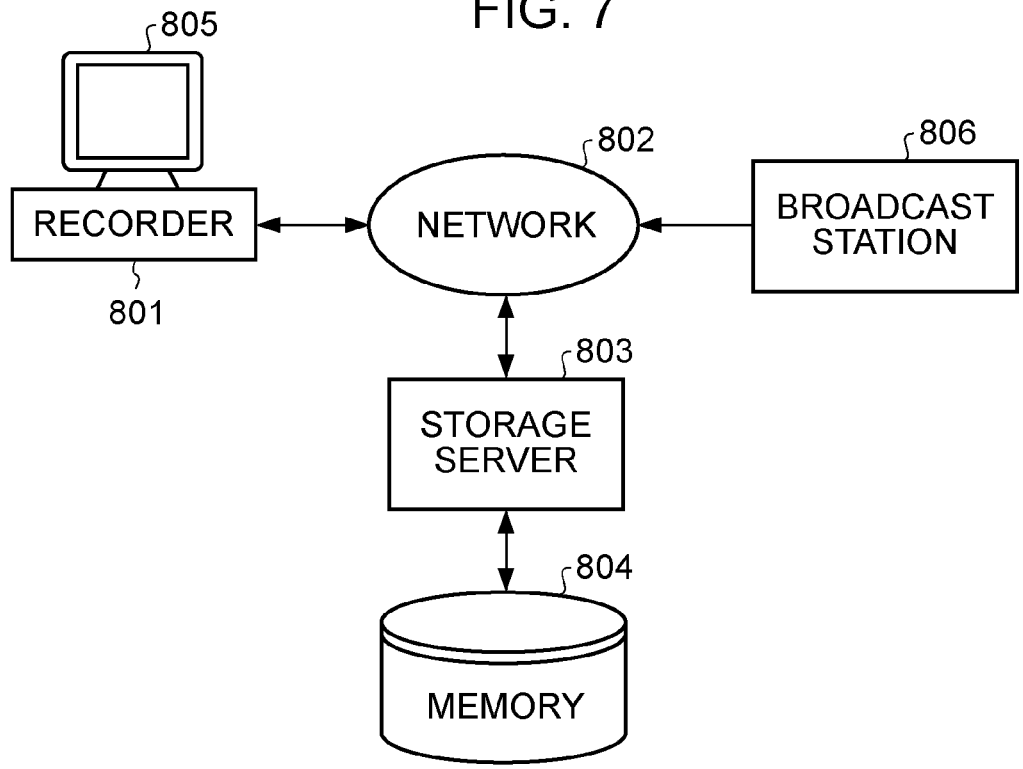
FIG. 7 is a block diagram of an example system according to another embodiment of the present invention.

As illustrated in FIG. 7, the recorder 801 may receive moving image data from the broadcast station 806 over the network 802.

Figure 11:
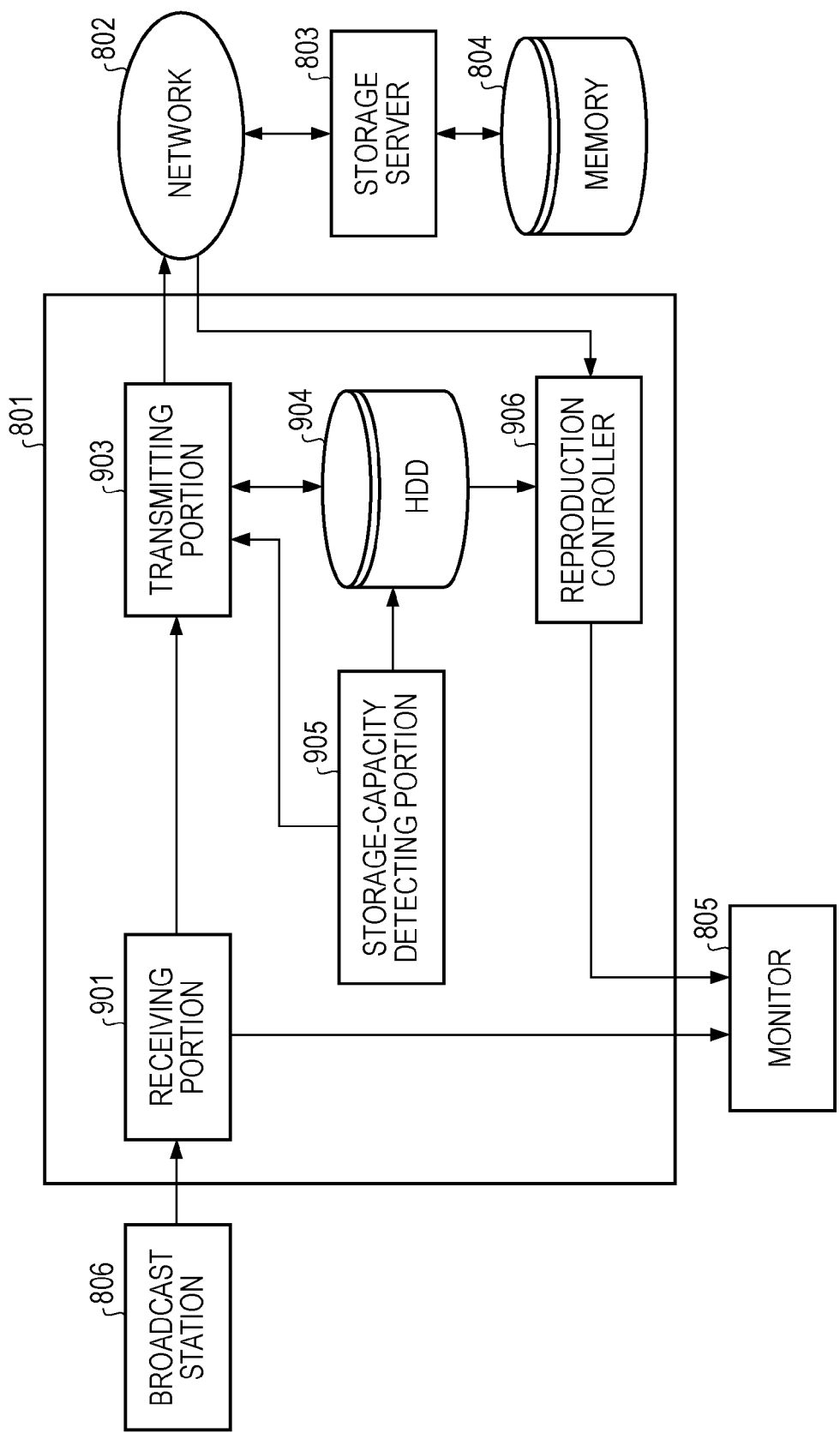
FIG. 11 is a block diagram of an example system according to still another embodiment of the present invention.

If moving image data that has not been encoded is transmitted from the broadcast station 806, the recorder 801 may include neither an encoder nor a decoder, as illustrated in FIG. 11.

As described above, a user can record moving image data without paying much attention to the amount of available storage capacity of the HDD by the use of the recorder 801 being an image reproducing apparatus according to the present embodiment transferring at least part of the moving image data to the storage server. Because moving image data in the forward part of a sequence is stored in the HDD, in which a delay time occurring in reading data is shorter than that in the storage server, the image pickup apparatus can quickly reproduce images in response to an instruction to start reproduction from a user. Moreover, because the forward part of the sequence remains in the HDD, when a user finishes reproduction in progress, data transmission over a network may not occur.

Fourth Exemplary Embodiment

A fourth embodiment is a modification example of an operation of the image pickup apparatus illustrated in FIG. 1. In this modification example, the storage controller 103 stores a specified number of GOPs in the memory 104, starting from the leading end of a sequence of target moving image data, in response to an instruction. It is noted that the number of pictures, instead of GOPs, may be specified by the storage controller 103, for example. The transfer portion 106 transfers target moving image data to the storage server 303. GOPs or pictures stored in the memory 104 may or may not be transferred to the storage server 303.

The transfer portion 106 may start transferring in the course of image capturing or after the completion of image capturing. In the case where the transfer portion 106 starts transferring after the completion of image capturing, the storage controller 103 temporarily stores all GOPs or pictures in the memory 104. After the transfer portion 106 starts transferring, the storage controller 103 deletes transferred GOPs or pictures from the memory 104.

Figure 16:
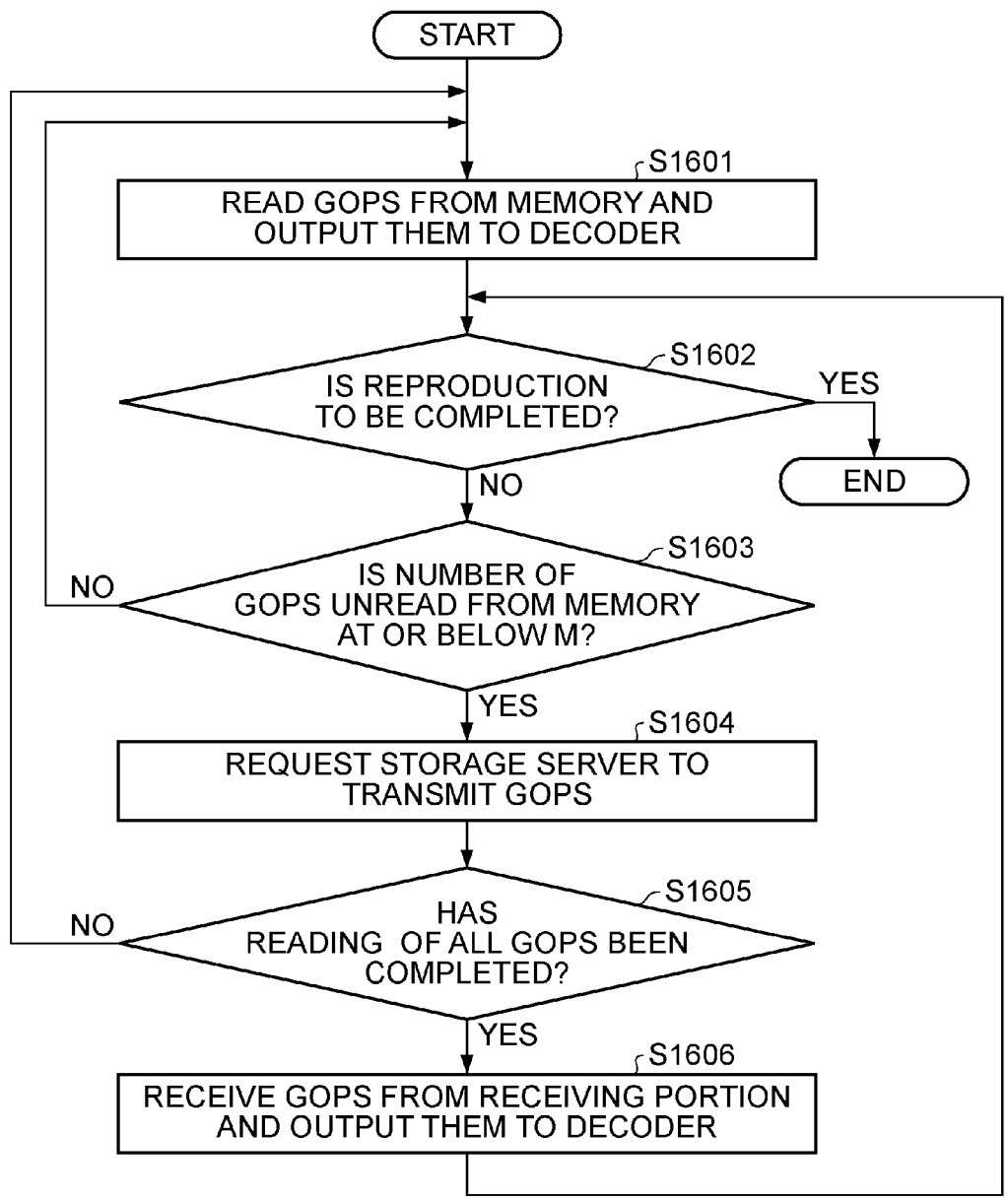
FIG. 16 is a flowchart of an example reproducing process performed by a reproduction controller according to a fourth embodiment of the present invention.

An example process of reproducing moving image data performed in the image pickup apparatus according to the fourth embodiment will now be described below with reference to the flowchart illustrated in FIG. 16.

In response to an instruction to reproduce a selected sequence (moving image data) from the outside, the reproduction controller 108 first reads GOPs constituting part of a corresponding sequence from the memory 104 in reproduction order. The reproduction controller 108 outputs them to the decoder 109 to reproduce the moving image data on the display portion 110 (S1601).

Then, the reproduction controller 108 determines whether the reproduction is to be completed (S1602). Specifically, the reproduction controller 108 determines whether the reproduction controller 108 completes outputting of all GOPs that constitute the sequence and that are stored in the memory 104 to the decoder 109 or an instruction to stop the reproduction is provided from a user. When either one of the above conditions is satisfied (YES in S1602), the reproduction controller 108 finishes the process for reproducing moving image data.

When the process for reproducing moving image data is not to be completed (NO in S1602), flow proceeds to step S1603. The reproduction controller 108 determines whether the status of moving image data that has not yet been read from the memory 104 and that has not been reproduced satisfies a predetermined condition (S1603). For example, the reproduction controller 108 determines whether the number of GOPs that have not yet been read from the memory 104 is at or below M. One example method of calculating the numerical value M can be calculation based on the number of GOPs decoded during the time from when a transmission request is output to the storage server 303 to when the receiving portion 107 receives data. Another example may be calculation based on the capacity of the receiving buffer (not shown in FIG. 1). Furthermore, M may be the number of all GOPs constituting the sequence. In this case, the reproduction controller 108 outputs a transmission request to the storage server 303 immediately after reading the leading GOP in the sequence from the memory 104.

When the number of GOPs that have not yet been read from the memory 104 is not at or below M (NO in S1603), the reproduction controller 108 performs the processing of S1601 again. Otherwise (YES in S1603), the reproduction controller 108 requests the storage server 303 to transmit GOPs (S1604). Specifically, the reproduction controller 108 outputs a request to transmit GOPs that have not stored in the memory 104 to the storage server 303.

More specifically, the reproduction controller 108 requests the storage server 303 to sequentially transmit, of GOPs stored in the server memory 304, GOPs that have not been stored in the memory 104, starting from a GOP to be reproduced first. For example, in the case where GOP 1 to GOP 3 within a sequence composed of GOP 1 to GOP 10 are stored in the memory 104, the moving image data is sequentially received starting from GOP 4, which follows GOP 3. Each of the GOPs being moving image data stored in the memory 104 and the storage server 303 is associated with information indicating its reproduction order, and the information is also stored. The reproduction controller 108 can make a request for a GOP based on the associated information.

The reproduction controller 108 determines whether all the GOPs being moving image data stored in the memory 104 have been read (S1605). When not all the GOPs have yet been read (NO in S1605), the reproduction controller 108 performs the processing of S1601 again. When all the GOPs have been read (YES in S1605), the reproduction controller 108 receives the GOPs from the receiving portion 107 and outputs them to the decoder 109 (S1606). Then, the processing of S1602 is performed again.

The reproduction controller 108 may read moving image data or make a transmission request on a picture-by-picture basis or on a slice-by-slice basis, in place of a GOP-by-GOP basis.

As described above, a user can capture images without paying much attention to the amount of available storage capacity of the HDD by the use of the image pickup apparatus according to the fourth embodiment transferring at least part of the moving image data to the storage server. Because moving image data in the leading end of a sequence is stored in the memory incorporated in the image pickup apparatus, the memory having a shorter delay time occurring in reading data than that in the storage server, the image pickup apparatus can quickly reproduce images in response to an instruction to start reproduction from a user. Moreover, because moving image data in the forward part of the sequence remains in the memory, when a user finishes reproduction in progress, data transmission over a network may not occur.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-267994 filed Oct. 15, 2007 and No. 2007-267995 filed Oct. 15, 2007, which are hereby incorporated by reference herein in their entirety.

What is claimed is:

1. A moving image reproducing apparatus comprising:
   a reproduction control unit configured to control reproduction of a plurality of moving image data elements;
   a storage control unit configured to store the plurality of moving image data elements in a memory;
   a transfer unit configured to, for storing a new moving image data element in the memory by the transfer unit, transfer, to an external storage device, the moving image data element to be reproduced last by the reproduction control unit among a first sequence selected from the first and second sequences stored in the memory, the first sequence including a first plurality of moving image data elements and the second sequence including a second plurality of moving image data elements.

2. The moving image reproducing apparatus according to claim 1, further comprising:
   a storage-capacity detecting unit configured to detect an amount of storage capacity of the memory,
   wherein the transfer unit is configured to transfer the moving image data element when the amount of available storage capacity of the memory detected by the storage-capacity detecting unit is at or below a predetermined value.

3. The moving image reproducing apparatus according to claim 1, wherein the reproduction control unit is configured to request the storage device to transmit moving image data element subsequent to reproduction of the moving image data elements stored in the memory and configured to control reproduction of the moving image data element transmitted from the storage device.

4. A method for processing a plurality of moving image data elements in a moving image reproducing apparatus including a reproduction control unit, the method comprising:
   controlling storing of the plurality of moving image data elements in a memory of the moving image reproducing apparatus; and
   transferring, for storing a new moving image data element in the memory by the transferring step, to an external storage device, the moving image data element to be reproduced last by the reproduction control unit among a first sequence selected from the first and second sequences stored in the memory, the first sequence including a first plurality of moving image data elements and the second sequence including a second plurality of moving image data elements.

5. A computer readable medium containing computer-executable instructions for causing a computer to execute processing for a plurality of moving image data elements, the medium comprising:
   computer-executable instructions for controlling storing of the plurality of moving image data elements in a memory of the moving image reproducing apparatus; and
   computer-executable instructions for transferring, for storing a new moving image data element in the memory by the transferring step, to an external storage device, the moving image data element to be reproduced last by a reproduction control unit among a first sequence selected from the first and second sequences stored in the memory, the first sequence including a first plurality of moving image data elements and the second sequence including a second plurality of moving image data elements.

6. The moving image reproduction apparatus according to claim 1, wherein the transfer unit transfers to the external storage device a plurality of moving image data elements to be reproduced last among the first sequence in accordance with an amount of storage capacity of the memory.

7. The moving image reproduction apparatus according to claim 1, wherein the transfer unit transfers to the external storage device the moving image data element of the first sequence of which a data size is larger than the second sequence.

8. The moving image reproduction apparatus according to claim 1, wherein the transfer unit transfers to the external storage device the moving image data element of the first sequence selected by a user.

9. The moving image reproduction apparatus according to claim 1, further comprising a delete unit configured to delete the moving image data element which is transferred to the external storage device from the memory.

10. The moving image reproduction apparatus according to claim 1, wherein the new moving image data element is stored in the memory as a third sequence by the storage control unit.

11. The method according to claim 4, wherein a plurality of moving image data elements to be reproduced last among the first sequence is transferred to the external storage device by the transferring step in accordance with an amount of storage capacity of the memory.

12. The method according to claim 4, wherein the moving image data element of the first sequence of which a data size is larger than the second sequence is transferred to the external storage device by the transferring step.

13. The method according to claim 4, wherein the moving image data element of the first sequence selected by a user is transferred to the external storage device by the transferring step.

14. The method according to claim 4, further comprising deleting the moving image data element which is transferred to the external storage device from the memory.

15. The method according to claim 4, wherein the new moving image data element is stored in the memory as a third sequence by the controlling storing step.

* * * * *